INVENTORS
AXEL B. ALGREN
EDWIN F. SNYDER
BY Joseph E. Ryan
ATTORNEY

INVENTORS
AXEL B. ALGREN
EDWIN F. SNYDER
BY
Joseph E. Ryan
ATTORNEY

United States Patent Office 2,986,018
Patented May 30, 1961

2,986,018
CONTROL APPARATUS FOR REFRIGERATION SYSTEM

Axel B. Algren, Minneapolis, and Edwin F. Snyder, Robbinsdale, Minn.; said Snyder assignor to Minneapolis-Honeywell Regulator Company, Minneapolis, Minn., a corporation of Delaware Filed Feb. 20, 1956, Ser. No. 566,406

5 Claims. (Cl. 62—227)

The present invention is concerned with an improved air conditioning control system, in particular where the space temperature is controlled by the circulation of air through a heat exchanger, the exchanger being supplied by a plurality of refrigeration stages. Each time there is a call for cooling by a space thermostat a maximum cooling capacity, by energizing all of the stages simultaneously, is obtained. The stages are shut down in sequence as the space thermostat is satisfied. Thus, each time there is a call for sensible cooling the heat exchanger capacity is increased to its maximum so that if the humidity is high latent cooling takes place.

In present cooling systems, it is common to have a humidity responsive control for regulating the heat exchanger capacity to obtain dehumidification. During dehumidification a "reheat" heater is often used downstream of the cooling or evaporator coil to reduce the sensitive cooling. Such a system involves a considerable amount of equipment and duct work and is quite expensive. There is a need for an inexpensive system to provide cooling and yet keep the humidity down a reasonable amount.

In the present invention it is desired to keep the cooling system relatively simple and inexpensive by reducing the number of controls used. Here stages of refrigeration are controlled from a space thermostat; however, upon a call for cooling by the thermostat all of the stages are simultaneously energized to provide a maximum cooling capacity and thus provide latent cooling for dehumidification. As the thermostat is satisfied and the space temperature drops the stages are turned off in sequence. With such a system even during mild weather with light loads there is sufficient capacity available to provide dehumidification or latent cooling each time the thermostat initiates operation of the cooling equipment.

It has been found by the proper selection of the refrigeration capacity that adequate dehumidification is provided with this system without the use of a humidity control.

It is therefore an object of the present invention to provide an improved air conditioning control system.

Another object of the present invention is to provide in a system for controlling temperature to turn on the maximum cooling capacity each time there is a call for cooling.

Still another object of the present invention is to provide in a cooling system having a plurality of stages of refrigeration to simultaneously energize all stages each time the space thermostat calls for cooling and for shutting the stages down in sequence as the space temperature is satisfied.

These and further objects of the present invention will become apparent upon a study of the following specification and drawings of which:

Description of figure one

Figure 1:
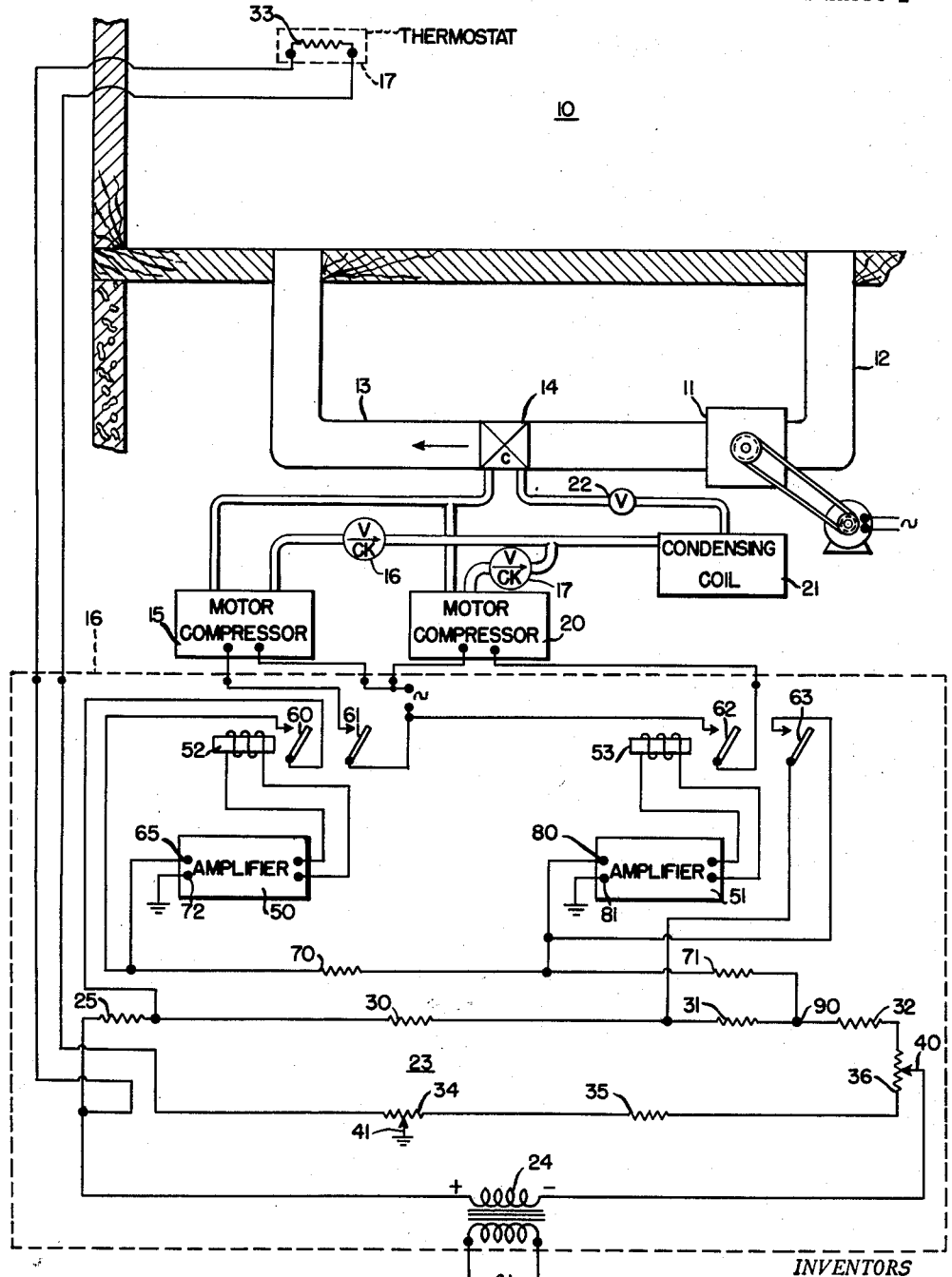
Figure 1 is a schematic diagram of one embodiment of the present invention with a single coil heat exchanger in a cooling system.

Referring to the Figure 1 the temperature of the air in space 10 is controlled by circulating the air by means of a fan 11 through a duct system comprising a return duct 12 and a supply duct 13. The ducts are connected so that the fan 11 forces air through a suitable cooling or evaporator coil 14.

Coil 14 is connected to conventional motor compressor units 15 and 20 connected in parallel to supply compressed refrigerant to the coil through a conventional condensing coil 21 and expansion valve 22. Suitable check valves 16 and 17 are used to prevent reverse flow through the compressors. The temperature of evaporator coil 14 depends upon the capacity of the refrigeration system and thus whether one or both of the motor compressor units are in operation. The system is designed so that when both motor compressor units are energized the combined capacity is such that the temperature of coil 14 will be lowered a substantial amount to provide latent cooling. The selection of the compressor or the cooling capacity for a particular space 10 is quite important for the proper operation of this invention.

Motor compressor units 15 and 20 can be controlled by a thermostat or thermostats or some sort of control to provide the proper operation, that is, to energize the compressors together upon a call for cooling and to de-energize them in sequence as the space temperature drops. A panel 16, having a thermostat 17 connected thereto, is shown for obtaining the above mentioned control sequence. It should be recognized that panel 16 could be replaced by an appropriate sequencing device to obtain the mode of operation desired.

Panel 16 contains a bridge circuit 23 which comprises a source of power 24 having parallel branches connected to its output terminals. A first branch comprising resistors 25, 30, 21, and 32 and the second branch comprising resistors 33, 34, and 35. One end of each of the branches is connected to the ends of a resistor 36 which has a movable wiper 40 thereon connected to one terminal of power source 24. Wiper 40 is for calibration purposes. Resistor 33 is temperature responsive and is located in space 10 to respond to the space temperature. A movable wiper 41 positioned on resistor 34 is connected to ground and is positioned for the calibration of the circuit.

A pair of amplifiers 50 and 51 each have their associated relays 52 and 53, respectively connected to the output circuit of the amplifiers. These amplifiers are of a sort shown in the Albert P. Upton Patent No. 2,423,534 having an A.C. input and output the magnitude of the output varying substantially proportional to the magnitude of the input signal. Relay 52 has a pair of switches or contacts 60 and 61 and relay 53 has a pair of switches or contacts 62 and 63, the switches being closed when the respective relay is energized. Input terminal 65 of amplifier 50 is connected to the junction of resistors 31 and 32 through a circuit comprising resistors 70 and 71. Terminal 65 is also connected through switch 60 to the junction of resistors 25 and 30. A second terminal 72 of amplifier 50 is grounded. Switch 61 is connected in the power supply circuit of motor compressor 15 so that when switch 61 is closed the compressor is energized. Input terminal 80 of amplifier 51 is connected to the junction of resistors 70 and 71. A second input terminal 81 is grounded. Input terminal 80 is also connected through switch 63 to the junction of resistors 30 and 31. Switch 62 is connected in the power supply circuit of motor compressor 20 so that upon switch 62 closing the motor compressor is energized.

Periodically the operation sequence of compressors 15 and 20 can be changed by switching the input leads or by a conventional sequence reversing device so the operating time over long periods is equalized.

Operation of Figure 1

As shown in the figure, the space temperature is satisfied and motor compressor units 15 and 20 are de-energized. Let us assume that the space temperature increases and the resistance of the thermostat or resistor 33 increases. Further, let us assume for explanation purposes that the instantaneous voltage of source 24 has the polarity as indicated, that is the left-hand side being positive with respect to the right-hand side. As the resistance of resistor 33 increases the voltage of the junction 90 between resistors 31 and 32 increases. The amplifiers 50 and 51 are set so the same input voltage causes energization of their association relays. When the output bridge 23, as the space temperature rises, reaches some predetermined value, both relays 52 and 53 are energized. Motor compressor units 15 and 20 are then simultaneously energized.

It is obvious that the simultaneous energization of such motor compressor units makes a large power drain on the line as normally starting currents for such motor compressor units are quite high. Thus, a time delay mechanism might be inserted in one of the compressor units to delay its energization a few seconds; however, it is understood that the motor compressor units are substantially energized at the same time so that their combined capacities provide for the dropping of the temperature of coil 14 quite rapidly.

Let us assume that the relative humidity of space 10 is quite high. Upon the call for cooling by the space thermostat the coil temperature is lowered below the dew point temperature and water condenses on coil 14. During the operation the greater percentage of cooling capacity is being used for the latent cooling or dehumidification thus the sensible cooling is small and the space temperature is slightly affected. The latent cooling continues until the relative humidity drops to a level where the amount of sensible cooling increases thereby dropping the space temperature. When the first compressor is de-energized, the output of the remaining compressor is mainly for sensible cooling as the coil temperature is not as low as before.

Whenever there is a call for cooling and the relative humidity is low, naturally little latent cooling takes place and the space temperature is affected rather quickly, thus the one compressor soon shuts down.

The amount of dehumidification obtained depends largely upon the load vs. refrigeration capacity and once this is established improved dehumidification is obtained without an expensive installation and a humidity responsive control device.

Upon contacts 60 and 63 closing, bridge circuit 23 is modified so that the drop-out voltage necessary to de-energize relays 52 and 53 is different. As the resistance of resistor 33 decreases first amplifier 51 is de-energized and then upon a subsequent further reduction of the space temperature to that desired by the space thermostat, amplifier 50 will be de-energized.

With such a control apparatus it is seen that if the space thermostat calls for cooling, compressor units 15 and 20 are simultaneously energized so that even during light loads when normally only one compressor unit is needed to supply the cooling necessary the temperature of coil 14 will be lowered for latent cooling and dehumidification. With two similar motor compressor units being used, a simultaneous energization of the compressor units does not produce twice as much capacity for sensible cooling as one compressor unit, as when both are energized together, a large amount of the capacity is used in latent cooling until the humidity is lowered.

Figure 2:
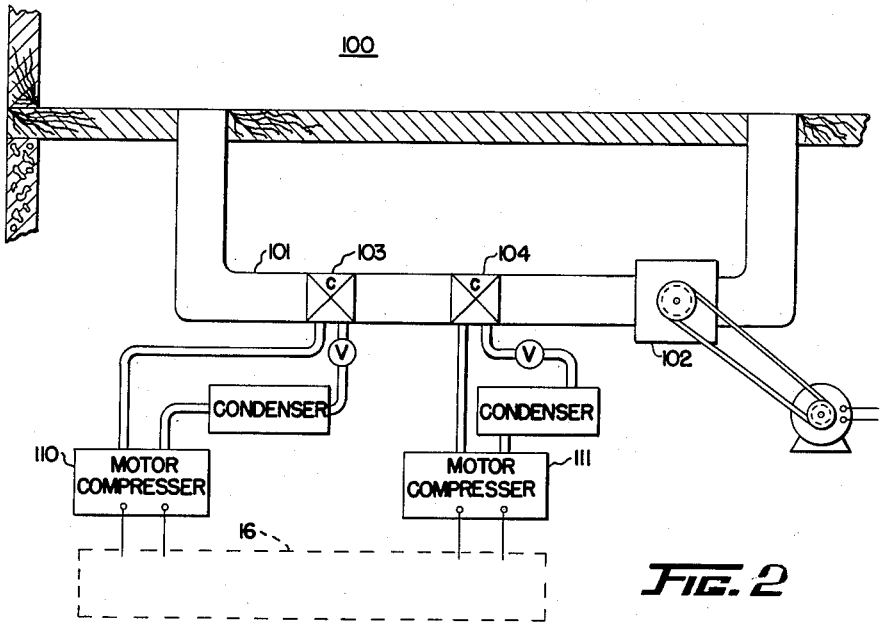
Figure 2 is a schematic diagram of another embodiment of the present invention with a series coil heat exchanger in a cooling system.

Description of Figure 2

In another embodiment of the present invention as shown in Figure 2, space 100 is conditioned by circulating air through a duct 101 by means of a fan 102. The heat exchanger comprises coils 103 and 104 mounted in a series relation in duct 101. Each of these mentioned coils are connected to their own separate refrigeration systems. Motor compressor 110 delivers compressed refrigerant through a suitable condenser and expansion valve to coil 103 whenever it is energized. Motor compressor 111 delivers refrigerant in a similar manner to coil 104 when it is energized. The motor compressors 110 and 111 are connected to panel 16, shown in Figure 1, to provide the same operating sequence as compressors 15 and 20 of that figure.

Assuming that panel 16 provides the same operating sequence as described in connection with Figure 1. Whenever the temperature of space 100 rises above a predetermined level the thermostat associated with panel 16 will energize both compressors 110 and 111 to provide the full cooling capacity. Both coils 103 and 104 receive refrigerant simultaneously. With this large cooling capacity the air in passing through the coil would receive the maximum amount of latent cooling thus removing humidity therefrom. As soon as the temperature of space 100 drops slightly one of the compressors is de-energized and the cooling of the air in space 100 is continued with only one compressor in operation. As the space temperature reached the desired level the remaining compressor is de-energized.

By the simultaneous energization of compressors 110 and 111 whenever there is a call for cooling a maximum amount of latent cooling is obtained for dehumidification.

Figure 3:
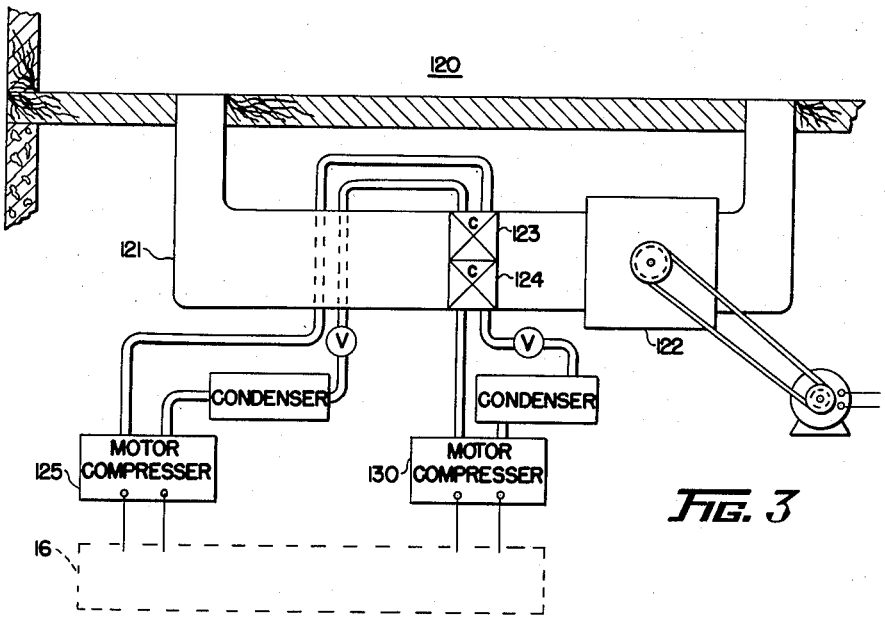
Figure 3 is a schematic diagram of another embodiment of the present invention with a parallel coil heat exchanger in a cooling system.

Description of Figure 3

In the embodiment as shown in Figure 3, space 120 is conditioned by circulating air through duct 121 by the operation of fan 122. Mounted in duct 121 is a heat exchanger comprising coils 123 and 124 mounted in parallel, that is, side by side, so that half of the air passes through one coil and half through the other. Each of these coils is connected to a separate source of refrigerant. Motor compressor 125 is connected to coil 123 through a conventional condenser and expansion valve and motor compressor 130 is connected to coil 124.

The motor compressors 125 and 130 are connected to panel 16 as disclosed in Figure 1. The panel with its associated space thermostat provides the proper sequence for the motor compressors, that is, whenever there is a call for cooling in space 120 both compressors 125 and 130 are energized simultaneously. As the space temperature drops first one compressor is de-energized and then as the space temperature further drops to the control point the other compressor is de-energized.

As shown in Figure 3, the heat exchanger comprises the parallel coils 123 and 124. As arranged these coils provide for maximum cooling whenever both compressors are energized. When there is a call for cooling and panel 16 turns on both compressors and a maximum capacity is available as all of the air passes through the coils.

Whenever the coil temperature is below the dew point of the air entering the coil, some latent cooling is obtained. The percentage of latent to sensible cooling is determined by the relative humidity of the air and the coil temperature. When the relative humidity is high the percentage of latent cooling is high and a maximum dehumidification is obtained. When the capacity of the heat exchanger is such that it can handle the greatest amount of air while it is at that high relative humidity level a maximum water removal is obtained. Whenever there is a call for sensible cooling, panel 16 energizes both motor compressors 125 and 130 to lower the coil temperature of coils 123 and 124. If the relative humidity of the air in space 120 is high the percentage of latent cooling with respect to sensible cooling is high and thus dehumidification takes place. By bringing on the compressors simultaneously rather than in stages as conventionally done a maximum capacity is obtained in the heat exchanger and more air can be handled while it is at that high relative humidity when the percentage of latent cooling with respect to sensible cooling is high. This is an improvement over the staging method of such conventional refrigeration apparatus as in the staging method for a certain increase in the sensible temperature one compressor would be brought on; however, with this lower capacity for cooling less air would be handled while at the high relative humidity and the degree of dehumidification would be lower. The simultaneous energization of the motor compressor units every time there is a call for cooling increases the total amount of dehumidification obtained from a similar apparatus using the conventional method of staging.

While the invention is shown with three embodiments, it is obvious that there are other ways of obtaining a full capacity upon a call for cooling and reducing the capacity as the cooling load decreases. Therefore, it is intended that the scope of the present invention be limited only by the appended claims in which we claim:

1. In a temperature and dehumidification control apparatus, a refrigeration heat exchanger mounted in a duct system so that air from a space can be forced therethrough for cooling and dehumidifying, plurality of stages of refrigeration compressing means, means connecting said stages of compressing means to said heat exchanger, temperature responsive means responsive to space temperature, and means connecting said temperature responsive means to control said plurality of stages so that upon a rise in the space temperature said stages are energized by said responsive means simultaneously and upon a drop in the space temperature said stages are shut down in sequence.

2. In refrigeration control apparatus for use in cooling and dehumidification, temperature responsive means responsive to a space temperature, plurality of stages of refrigeration, refrigeration evaporation and heat exchanging means, means connecting said stages to said evaporation and heat exchanging means, and means connecting said temperature responsive means to control said stages so that upon a call for cooling said stages are substantially simultaneously energized as the temperature of said responsive means increases and said stages are de-energized in sequence as the temperature of said responsive means decreases.

3. In a cooling system having a plurality of refrigeration compressors, temperature responsive means responsive to a space temperature, and means for connecting said temperature responsive means to control energization of said compressors so that upon a call for cooling the compressors are energized simultaneously to provide a maximum cooling capacity and upon a drop in the space temperature the compressors are de-energized in sequence to effectively reduce said cooling capacity a certain amount as each of said compressors is de-energized.

4. In air conditioning apparatus for providing dehumidification each time there is a call for cooling, heat exchanging means through which air is circulated for conditioning a space, first means for supplying cooling medium to said heat exchanging means, temperature responsive means responsive to space temperature, and means connecting said temperature responsive means to said first means for scheduling the cooling capacity of said heat exchanging means so that upon an initial call for cooling as determined by said responsive means said first means provides a maximum supply of cooling medium to said heat exchanging means to accomplish a maximum amount of latent cooling of the space air for dehumidification with a minimum amount of sensible cooling of the space air and as the space temperature drops as determined by said responsive means said first means gradually reduces the supply of cooling medium to said heat exchanging means to reduce the amount of latent cooling and to accomplish a maximum amount of sensible cooling in the space.

5. In a refrigeration control apparatus, a heat exchanger, a refrigeration apparatus, means connecting said refrigeration apparatus to said heat exchanger, temperature responsive means responsive to the temperature of the air being cooled by said exchanger, and means connecting said responsive means to said refrigeration apparatus so that a maximum cooling capacity is obtained whenever there is a call for cooling by said responsive means to effectively reduce the temperature of said heat exchanger a maximum amount to obtain dehumidification of the air with practically no change in the air temperature and as the air temperature drops as sensed by said responsive means said cooling capacity is gradually reduced to effectively increase the temperature of said heat exchanger.

References Cited in the file of this patent

UNITED STATES PATENTS

| | | |
|---|---|---|
| 2,155,484 | Gottlieb | Apr. 25, 1939 |
| 2,185,198 | Huggins | Jan. 2, 1940 |
| 2,665,560 | Hubbard | Jan. 12, 1954 |